United States Patent [19]

Greene et al.

[11] 4,273,695

[45] Jun. 16, 1981

[54] ETHYLENE-ACRYLIC ENAMELS

[75] Inventors: Robin N. Greene, Wilmington, Del.; Walter R. Hertler, Kennett Square, Pa.

[73] Assignee: E. I. Du Pont de Nemours and Company, Wilmington, Del.

[21] Appl. No.: 105,642

[22] Filed: Dec. 20, 1979

[51] Int. Cl.$^3$ ............................................. C08L 61/28
[52] U.S. Cl. ........................... 260/29.4 UA; 260/29.3; 260/29.6 NR; 260/29.6 TA; 260/32.8 A; 260/32.8 N; 260/33.2 R; 260/33.6 PQ; 260/33.6 UA; 428/460; 428/462; 525/162
[58] Field of Search ....... 525/162, 29.4 UA, 29.6 TA, 525/29.6 NR, 33.6 UA, 33.6 PQ, 32.8 N, 32.8 A

[56] References Cited

U.S. PATENT DOCUMENTS

| | | | |
|---|---|---|---|
| 3,674,734 | 7/1972 | Parner | 260/31.2 N |
| 4,060,657 | 11/1977 | Iwami et al. | 260/29.6 TA |
| 4,061,822 | 12/1977 | Brodnyan et al. | 428/315 |
| 4,164,488 | 8/1979 | Gregorovich et al. | 260/29.4 UA |

FOREIGN PATENT DOCUMENTS 52-43829  4/1977  Japan .
52-115832 9/1977  Japan .

OTHER PUBLICATIONS

Chem. Abstracts, vol. 90, Inoue et al., 1979, p. 84 (56441v).
"Treatise on Coatings", vol. 4, Part I, pp. 192-193, McBane in Myers and Long (Ed.).

*Primary Examiner*—Theodore E. Pertilla

[57] ABSTRACT

Curable coating composition containing the film-forming ingredient consisting essentially of, with the sums of the parts by weight and the mole percentages being 100 and 100%, respectively:

(1) about 55-95 parts by weight of a copolymer of
  (a) 20-70 mole % ethylene,
  (b) 20-60 mole % methyl methacrylate,
  (c) 1-15 mole % of a hydroxyalkyl ester of acrylic acid or methacrylic acid in which the hydroxyalkyl group contains 2-4 carbon atoms, and
  (d) 0-9 mole % of an $\alpha,\beta$-unsaturated carboxylic acid selected from acrylic acid, methacrylic acid, itaconic acid, crotonic acid, 2-ethylacrylic acid, and 2-propylacrylic acid, or of maleic anhydride, and (2) about 5-45 parts by weight of a nitrogen-resin crosslinking agent.

14 Claims, No Drawings

ETHYLENE-ACRYLIC ENAMELS

DESCRIPTION

1. Technical Field

This invention relates to a curable acrylic coating composition.

2. Background

Curable acrylic coating compositions which are useful in thermosetting enamels are well known in the art. For example, U.S. Pat. No. 3,674,734 discloses a complex multicomponent composition, especially useful in automobile enamels, comprising: (A) an interpolymer of styrene, methyl methacrylate, a $C_{2-4}$ alkyl acrylate or methacrylate, a $C_{1-4}$ hydroxyalkyl acrylate or methacrylate, and an $\alpha,\beta$-unsaturated monocarboxylic acid, said interpolymer having a relative viscosity in ethylene dichloride at 25° C. of 1.08 to 1.14, (B) an interpolymer of styrene or methyl methacrylate, a $C_{2-4}$ alkyl acrylate or methacrylate, a $C_{1-4}$ hydroxyalkyl acrylate or methacrylate, and an $\alpha,\beta$-ethylenically unsaturated monocarboxylic acid, said interpolymer having a relative viscosity as described above of 1.04 to 1.08, and (C) a $C_{3-4}$ alkylolated melamine formaldehyde or a blend thereof with urea formaldehyde.

It is an object of this invention to provide a relatively simple, easily preparable, economically feasible, curable acrylic coating composition which is especially useful in automobile enamels and which includes a copolymer wherein greater than 75 mole % of the copolymer repeat units are provided by ethylene and methyl methacrylate.

DISCLOSURE OF THE INVENTION

This invention relates to a coating composition which is useful for making enamels, expecially automotive enamels. More specifically, it relates to a coating composition containing as an essential film-forming ingredient a copolymer of ethylene, methyl methacrylate, a hydroxyalkyl ester of an $\alpha,\beta$-unsaturated carboxylic acid, and optionally a free $\alpha,\beta$-unsaturated carboxylic acid, crosslinked by a nitrogen-resin crosslinking agent. A typical film-forming composition herein is comprised of an ethylene/methyl methacrylate/2-hydroxyethyl methacrylate/methacrylic acid copolymer and N,N',N"-hexakis(methoxymethyl)melamine.

The film-forming ingredient of the coating composition of the invention consists essentially of, with the sums of the parts by weight and the mole percentages being 100 and 100%, respectively:

(1) about 55–95 parts by weight of a copolymer of
 (a) 20–70 mole % ethylene,
 (b) 20–60 mole % methyl methacrylate,
 (c) 1–15 mole % of a hydroxyalkyl ester of acrylic acid or methacrylic acid in which the hydroxyalkyl group contains 2–4 carbon atoms, and
 (d) 0–9 mole % of an $\alpha,\beta$-unsaturated carboxylic acid selected from acrylic acid, methacrylic acid, itaconic acid, crotonic acid, 2-ethylacrylic acid, and 2-propylacrylic acid, or of maleic anhydride, and (2) about 5–45 parts by weight of a nitrogen-resin crosslinking agent.

It is to be understood that the aforesaid two-component film-forming ingredient of the coating composition can contain non-essential ingredients in addition to the essential components recited, that is, additional ingredients which do not substantially deleteriously affect the characteristics of the film-forming ingredient or the coating composition. Moreover, as will be understood by one skilled in the art, the coating composition containing the film-forming ingredient can be an aqueous dispersion, optionally containing organic solvents, or a solution in one or more organic solvents. Moreover, the coating composition can contain pigments, metal flakes, dispersants, viscosity-control agents, and other conventional additives for enamels. When the coating composition is a solution in one or more organic solvents, the aforesaid copolymer need not be a tetrapolymer, but rather, can be a terpolymer of components (a), (b) and (c).

Preferably, the hydroxyalkyl ester component (c) of the copolymer is a hydroxyalkyl methacrylate, and most preferably, it is 2-hydroxyethyl methacrylate. Preferably, the $\alpha,\beta$-unsaturated acid component (d) of the copolymer is acrylic acid or methacrylic acid, and most preferably, it is methacrylic acid.

The composition of the invention can be converted by conventional coating and baking procedures to hard, flexible, durable coatings on substrates such as glass, metals, and elastomers.

The ethylene copolymer that is an essential component of the film-forming ingredient of the coating composition can be prepared by methods that are well known in the art. For example, it can be prepared by solution polymerization, high-pressure bulk polymerization, or medium-pressure emulsion polymerization. Conventional polymerization initiators such as azonitriles, organic peroxides or hydroperoxides, and persulfates can be used. When the copolymer is prepared in an emulsion system, the surfactant can be a conventional dispersing agent such as the sodium salt of a long-chain alkyl sulfate. Alternatively, the surfactant can be a relatively low-molecular-weight ethylene/acrylic copolymer such as an ethylene/methyl methacrylate/methacrylic acid copolymer. The latter has the advantage that it is much more resistant to being leached out from the copolymeric film-forming constituent. The preparation of a polymeric surfactant of this type is described in Example 3.

Generally, in order to incorporate the desired amount of combined ethylene in the film-forming copolymer, the copolymerization is carried out at a pressure of at least about 5000 psi (34.5 MPa) and a temperature of at least about 70° C.

When the coating composition is an aqueous emulsion obtained directly from an emulsion copolymerization or an aqueous dispersion formed by dispersing bulk copolymer in water, optionally containing organic solvents, the system is optionally and preferably stabilized by adding enough base to neutralize some or all of the pendent carboxyl groups of component (d) of the copolymer. As is well known in the art, alkylamines and hydroxyalkylamines are particularly suitable for this purpose. It is advantageous to use amines that are liquid at room temperature and appreciably soluble in water. Examples include propylamine, butylamine, diethylamine, triethylamine, 2-hydroxyethylamine, 2-hydroxyethyldimethylamine (2-dimethylaminoethanol), 3-hydroxypropyldiethylamine, and the like. The most stable dispersions are usually formed at a pH of about 6 to about 9. When the coating composition is a solution in one or more organic solvents, the presence of carboxyl groups in the copolymer (and, thus, component (d)) is not necessary for stability.

The nitrogen-resin crosslinking agent that is an essential component of the film-forming ingredient of the coating composition is a member of a class of compounds well known in the art. This class includes condensation products of formaldehyde and other aldehydes with compounds such as melamine, guanamine, benzoguanamine, urea, and phenol, and partially or completely alkylated products thereof. Alkylated melamineformaldehyde resins are particularly useful and are preferred.

As is well known in the art, the crosslinking reaction that takes place during baking (curing) can be carried out in the absence or presence of a catalyst. A catalyst is advantageously used to realize relatively high degrees of crosslinking. Suitable catalysts include alkanesulfonic acids, arenesulfonic acids, and hydrocarbyl acid phosphates.

The examples provided hereinafter illustrate embodiments of the invention. Following is a discussion of some of the methods that were used to characterize the products of the examples.

The compositions of the film-forming ethylene/acrylic copolymers were determined in a variety of ways, including elemental analysis for carbon and hydrogen, nmr (nuclear magnetic resonance) and combinations of these two methods. In addition, some of the values of combined methacrylic acid were determined by titration. Comparisons of the copolymer compositions determined by these different methods are presented. Tukon hardnesses were determined by the procedure of ANSI/ASTM C 849-76. Measurements of yellowing on exposure to ultraviolet light were made with a commercially available Du-Color Model 220 Colorimeter by the method of ANSI/ASTM D 2244-78. Gloss measurements were also determined by the method of ANSI/ASTM D 2244-78.

BEST MODE FOR CARRYING OUT THE INVENTION

The preferred embodiments which are exemplary of the coating composition of the invention are represented in Examples 2-6.

INDUSTRIAL APPLICABILITY

The curable coating composition of the invention is particularly useful in automobile enamels.

EXAMPLE 1

A. Preparation of Copolymer

A semi-continuous emulsion polymerization was performed in a nitrogen-purged, 7.6-liter stirred autoclave equipped with a cooling coil and a heater using the following materials:

(1) Initial charge: 1700 g of distilled water containing 57 g of aqueous 30% Duponol® WAQE surfactant (the sodium salt of technical dodecanol sulfate), the pH of which had been adjusted to 5 with 10% phosphoric acid, 204.7 g of methyl methacrylate, 33.6 g of 2-hydroxyethyl methacrylate, 16.8 g of methacrylic acid, and 4.3 g of dodecanethiol.

(2) Continuous monomer feed: 393 g of methyl methacrylate, 64.4 g of 2-hydroxyethyl methacrylate, 32.2 g of methacrylic acid, and 7.7 g of dodecanethiol.

(3) Continuous surfactant feed: 414 g of distilled water and 200 g of Duponol® WAQE adjusted to pH 5 with 10% phosphoric acid.

(4) Continuous initiator feed: 500 g of water and 20 g of ammonium persulfate.

With the initial charge in the autoclave, the agitator at 400 rpm, and the system pressured with ethylene to 6000 psi (41.4 MPa), the temperature was stabilized at 80° C. Then 133 ml of initiator feed was injected as fast as possible and the pressure was adjusted to 6000 psi (41.4 MPa). At the first indication of polymerization (pressure drop and/or temperature rise), pumping of the continuous monomer feed at 4 ml/min and pumping of the continuous surfactant feed at 1.4 ml/min were begun. Ethylene was fed as necessary to maintain 6000 psi (41.4 MPa) and bled off as necessary to maintain a maximum of 6400 psi (44.1 MPa). After 30 minutes the agitation rate was reduced to 250 rpm. When a total of 488 ml of monomer feed and 168 ml of surfactant feed had been pumped into the reactor (120 min), the pumps were stopped. The reactor was cooled to 40° C. and the emulsion was discharged. There was obtained 2.73 kg of emulsion with a solids content of 26.83%, corresponding to a yield of 732 g of ethylene/methyl methacrylate/hydroxyethyl methacrylate/methacrylic acid copolymer. Anal. found: C, 65.81, 66.01; H, 9.62, 9.74; O (by difference), 24.4. From the oxygen content of the polymer, and assuming incorporation of all the methacrylic monomers in the ratios charged, the ethylene content was estimated to be 25.9% by weight, and the weight % composition of the ethylene/methyl methacrylate/2-hydroxyethyl methacrylate/methacrylic acid copolymer was estimated to be 25.9/59.5/9.8/4.9. The corresponding mole % composition is 56.0/36.0/4.5/3.4. The molecular weight of the tetrapolymer measured by gpc (gel permeation chromatography) with polymethyl methacrylate as a standard was 23,000 ($\overline{M}_n$) and 139,000 ($\overline{M}_w$); its inherent viscosity ($\eta_{inh}$) was 0.38 (0.5% in $CH_2Cl_2$ at 25° C.).

B. Preparation of Coatings

1. A sample of the polymer of part A, precipitated with methanol and dried at room temperature, was dissolved in a solution of equal parts by volume of methyl ethyl ketone and toluene, and a small amount of insoluble gel was removed by centrifugation. The solution was coated on glass and baked at 120° C. for 30 minutes to give a faintly hazy, very flexible 3-mil (0.08 mm) film. When a solution containing 15% (based on polymer) of the melamine crosslinker Resimene® X-747 was coated on glass and baked at 120° C. for 30 minutes, the resulting coating had a Tukon hardness of 10 KHN. The samples of Resimene® used in this and the following experiments are commercially available methylated melamine-formaldehyde resins (methoxyalkylmelamines).

2. A similarly prepared (as in part 1) coating of the copolymer and 15% Resimene® X-747, after baking at 250° F. (122° C.) for 30 minutes, was completely flexible at room temperature, and when bent around a ½-inch (1.3 cm) mandrel at −20° F. (−29° C.) showed only one or two cracks.

3. A coating solution was prepared by dissolving 10 g of methanol-precipitated tetrapolymer (from part A) in 150 ml of methyl ethyl ketone and centrifuging to remove the substantial amount of gel. The solution was concentrated in vacuo to 30 ml, and 2 ml of butyl cellosolve was added. To 10 ml of the concentrated solution was added 1.4 g (about 30% based on polymer) of Resimen® X-735 and 0.02 ml of phenyl acid phosphate. The solution was coated on glass with a 25-mil (0.64- mm) doctor knife. Coatings thus prepared were baked for 30 minutes at 225° F. (107° C.), 275° F. (135° C.), and 300° F. (149° C.). By a similar procedure, but with only 0.58 g of Resimene ® X-735 instead of 1.4 g, coatings were prepared and baked with the same bake schedule. The coatings that were baked at 135° C. and 149° C. were very hard and brittle. The coatings that were baked at 107° C. were hard and flexible. All the coatings were insoluble in acetone. The coatings that were baked at 135° C. and 149° C. were unaffected by a 24-hour exposure at 60° C. in a Cleveland humidity chamber (a commercially available humidity exposure device), and under the same exposure conditions the coatings baked at 107° C. became somewhat hazy.

EXAMPLE 2

A. Preparation of Copolymer

The materials and procedures of Example 1 were used and carried out, respectively, with the following exceptions: instead of 4.3 g of dodecanethiol in the initial charge, 2.7 g of 2-octanethiol was used; and instead of 7.7 g of dodecanethiol in the continuous monomer feed, 4.8 g of 2-octanethiol was used. Small amounts (0.05 g) of ferrous ammonium sulfate were added to the initial charge and to the continuous surfactant feed. The product emulsion was filtered three times to remove coagulum. The resulting emulsion had a solids content of 25.6% corresponding to a polymer yield of 755.7 g. A sample of polymer was isolated by precipitation with methanol, followed by drying. Anal. found: C, 64.45, 64.73; H, 9.58, 9.47; O (difference) 25.88. Nmr (nuclear magnetic resonance) was used to determine the ratio of combined methyl methacrylate units to 2-hydroxethyl methacrylate units, and it was assumed that 2-hydroxymethacrylate and methacrylic acid were incorporated in the copolymer in the ratio they were charged as monomers. Based on the foregoing data, the weight % composition was estimated to be ethylene 21.5%, methyl methacrylate 65.6%, 2-hydroxyethyl methacrylate 8.6%, and methacrylic acid 4.3%. The corresponding mole % composition is 49.8/42.6/4.3/3.2. The molecular weight of the tetrapolymer measured by gpc was 6400 ($\overline{M}_n$) and 67,000 ($\overline{M}_w$); its inherent viscosity was 0.35 (0.5% in $CH_2Cl_2$ at 25° C.). The glass transition temperature, $T_g$, measured by dsc (differential scanning calorimetry), was −6° C.

B. Preparation of Coatings

1. Methanol-precipitated polymer (4.25 g) from the emulsion of part A and 0.75 g of Resimene ® X-747 were dissolved in 50 ml of 1/1 (by volume) toluene/methyl ethyl ketone. After centrifugation to remove gel particles, the solution was coated on glass panels and baked for 30 minutes at several temperatures.

2. The pH of 201.3 g of the emulsion of part A was brought to 8 with 2-dimethylaminoethanol, and 30.1 g of toluene and then 8.8 g of Resimene ® X-747 were stirred in. After two hours an additional 30 g of toluene was stirred in. The emulsion was then coated on glass panels and baked for 30 minutes at several temperatures as shown in Table 1.

TABLE 1

| Bake | Tukon Hardness (KHN) | |
|---|---|---|
| Temperature | Solution-Coated | Emulsion-Coated |
| 200° F. (93° C.) | 5.10 | 1.09 |
| 225° F. (107° C.) | 11.69 | 1.73 |
| 250° F. (121° C.) | 10.56 | 1.18 |

TABLE 1-continued

| Bake | Tukon Hardness (KHN) | |
|---|---|---|
| Temperature | Solution-Coated | Emulsion-Coated |
| 300° F. (149° C.) | 14.71 | 6.96 |

The solution-coated cured polymer on a flexible substrate could be bent around a 0.5-inch (1.3-cm) mandrel at −20° F. (−29° C.) without cracking.

EXAMPLE 3

A. Preparation of Polymeric Surfactant

A nitrogen-purged 1-gal (3.8-liter) stirred autoclave with baffles was charged with 208 ml of toluene and 208 ml of methyl ethyl ketone, pressured to 100 psi (690 kPa) with ethylene, and heated to 140° C. The ethylene pressure was then increased to 3,000 psi (20.7 MPa), and the stirring rate was adjusted to 400 rpm. Simultaneous pumping in of (1) a monomer feed consisting of 655 g of methyl methacrylate, 74.7 g of acrylic acid, and 11.6 g of 2-mercaptoethanol at 5 cc/min and (2) an initiator feed consisting of 9.2 g of t-butyl peracetate (in mineral spirits) and 185 ml of methyl ethyl ketone at 1.2 cc/min was begun. The temperature and pressure were kept at 140° C. and 3,000 psi (20.7 MPa). When the addition of the feeds was complete, stirring was continued at 140° C. and 3,000 psi (20.7 MPa) for 30 minutes. Then a solution of 1 g of t-butyl peracetate in 109 ml of methyl ethyl ketone was pumped into the reactor at 8 cc/min. After stirring for an additional 30 minutes, 160 ml of methyl ethyl ketone was pumped into the reactor. After stirring an additional 30 minutes the autoclave was cooled to 30° C., the pressure was released, and the polymer solution was concentrated under reduced pressure to give 802 g of ethylene/methyl methacrylate/acrylic acid copolymer, characterized by the following: its weight % composition by nmr was ethylene 11.7%, methyl methacrylate 79.2%, acrylic acid 9.06%, $T_g$ +20° C. (dsc); $\eta_{inh}$ 0.09 (0.5% in $CH_2Cl_2$ at 25° C.); molecular weight $\overline{M}_n$ 1000, $\overline{M}_w$ 6,700 (gpc). The polymer was stirred with water and 2-dimethylaminoethanol to give a surfactant solution of pH 8.5 containing 24% solids.

B. Preparaion of Copolymer

The materials and procedures of Example 2 were used and carried out, respectively, for the emulsion polymerization of ethylene, methyl methacrylate, 2-hydroxyethyl methacrylate, and methacrylic acid with the following exceptions: instead of 2.7 g of 2-octanethiol in the initial charge and 4.8 g in the continuous monomer feed, 2.4 g and 4.3 g, respectively, were used; and instead of 30% Duponol ® WAQE surfactant, 57 g of the 24% polymeric surfactant solution of part A was used at pH 8.5 without adjustment of pH to 5. The pressure was maintained between 7200 and 8400 psi (49.6 and 57.9 MPa). There was obtained 2,762 g of 17.78%-solids emulsion (corresponding to 491 g of polymer) and 74.8 g of coagulum. The pH was adjusted to 7.73 with 2-dimethylaminoethanol. The polymer did not precipitate on addition of methanol, so 100 ml of the emulsion was evaporated to dryness to obtain a polymer sample for analysis. Composition by weight by nmr analysis: ethylene 20.76%, methyl methacrylate 65.18%, hydroxyethyl methacrylate 9.37%, methacrylic acid 4.68%. Anal. found: C, 61.77, 62.02; H, 8.87, 8.99; O (difference), 29.2. $T_g$ was +23° C. (dsc):

$\eta_{inh}$ was 0.222 (0.5% in chloroform at 25° C.); molecular weight by gpc was $\overline{M}_n$ 8500, $\overline{M}_w$ 45,000. The elemental analysis corresponds to an approximate copolymer composition by weight of ethylene 11.4%, methyl methacrylate 71.1%, 2-hydroxyethyl methacrylate 11.7%, methacrylic acid 5.8%. The corresponding mole % composition is 31.9/55.8/7.1/5.3. The $T_g$ of +23° C. suggests that 11.4% combined ethylene (elemental analysis) is a more nearly accurate figure than 20.76% (nmr).

C. Preparation of Coatings

1. To 25 g of polymer emulsion from Part B was added with stirring a solution of 0.78 g of Resimene ® X-735 in 2 ml of butyl Carbitol ® (the monobutyl ether of diethylene glycol) and 1 ml of methyl ethyl ketone. The mixture was drawn down on primed steel and glass panels. During drying, the coatings shrank, giving thick (7.5-mil; 0.19-mm), very clear, glossy coatings. The panels were baked for 30 minutes at 225° F., 250° F., 275° F., and 300° F., (107° C., 121° C., 135° C., and 149° C.). After baking, slight cloudiness appeared. All of the coatings were insoluble in acetone. The thick coating baked at 275° F. (135° C.) cracked on bending at room temperature. It whitened when placed over steaming water. The glass panels were exposed for 419 hours to ultraviolet light in a commercially available Q-U-V Accelerated Weathering Tester. The results are shown in Table 2.

TABLE 2

| | Initial | | After 419 Hr | |
|---|---|---|---|---|
| Bake Temp. F. (°C.) | Tukon Hardness (KHN) | Yellowing (ΔB, Colorimeter) | Tukon Hardness (KHN) | Yellowing (ΔB, Colorimeter) |
| 225 (107) | 1.48 | +2.95 | 11.68 | 9.22 |
| 250 (121) | 2.96 | +3.20 | 11.16 | 9.29 |
| 275 (135) | 10.62 | +4.80 | 11.4 | 6.95 |
| 300 (149) | 11.89 | +8.76 | 13.7 | 7.88 |

2. By coating the polymer emulsion of part B at a higher level of solids, shrinkage of the coating could be avoided. Thus, to 50 ml of emulsion of part B was added 3 ml of butyl Carbitol ®. The resulting mixture was warmed at about 60° C. with stirring under a stream of nitrogen until the volume was reduced by half. This gave a 34.0% solids emulsion. To the concentrated emulsion was added a solution of 1.57 g of Resimene ® X-735 in 0.5 ml of butyl Carbitol ® with stirring. To reduce the viscosity, 0.5 ml more of butyl Carbitol ® was added. When the resulting dispersion was coated on glass, no shrinkage occurred during drying. A coating baked at 275° F. (135° C.) had a Tukon hardness of 11.96 KHN.

EXAMPLE 4

A. Preparation of Copolymers

Ethylene, methyl methacrylate, 2-hydroxyethyl methacrylate, and methacrylic acid were copolymerized at 170° C. and 27,000 psi (186 MPa) in a 700-cc high-pressure reactor with a four-paddle agitator and feed lines pressured with high-pressure compressors. The ethylene and methyl methacrylate were fed through the compressor, and the combined hydroxyethyl methacrylate/methacrylic acid feed was mixed at the exit of the compressor to reduce the chance of premature polymerization. The initiator was 2-t-butylazo-2-cyano-4-methylpentane. The agitator speed was 1650 rpm. Acetone was used for molecular-weight control.

The run was arbitrarily divided into states, each representing one hour's production of copolymer. During the first eight states the ethylene feed rate was 4.5 kg/hr, the feed rate of the 66.66% methyl methacrylate in 3:1 t-butanol-methanol was increased from 0.739 kg/hr to 0.898 kg/hr, and the feed rate of the 32.61% hydroxyethyl methacrylate/17.39% methacrylic acid in 3:1 t-butanol-methanol was decreased from 0.2 kg/hr to 0.09 kg/hr. Catalyst demand during the first eight states began at 2.15 kg catalyst/1000 kg of polymer, rose to 3.026 kg catalyst/1000 kg of polymer, and was 2.316 kg of catalyst/1000 kg of polymer at state 8. Composition of the polymer was estimated by elemental analysis for carbon and hydrogen during the run. The ethylene content of the early states was in the 30–41 weight % range, so the ethylene feed was reduced and the feeds of the other monomers and acetone were increased. For the 26th and final state, the ethylene feed rate was 2.268 kg/hr, methyl methacrylate 1.288 kg/hr, hydroxyethyl methacrylate/methacrylic acid 0.318 kg/hr, and acetone 1.732 kg/hr, and the catalyst demand was 2.272 kg/1000 kg of polymer. The polymer from each state was analyzed after removal of residual solvent in vacuo. The composition was estimated by the method of Example 2A. Titration for methacrylic acid units was also performed for some states. The weight percent combined ethylene in the copolymers ranged from a high of 41.0% in state 4 to a low of 14.2% in states 24 and 25.

Ethylene/methyl methacrylate/2-hydroxyethyl methacrylate/methacrylic acid (E/MMA/HEMA/MAA) copolymers produced in states 19, 20 and 21 were used to make coating compositions as described below in part B. The properties of the copolymers are listed in Table 3. The state designated 21B represents the second half-hour of state 21.

TABLE 3

| State | Weight % (Mole %) Composition | | | | Weight % MMA by Titration | $T_g$ | $\overline{M}_n$ | $\overline{M}_w$ |
|---|---|---|---|---|---|---|---|---|
| | E | MMA | HEMA | MAA | | | | |
| 19 | 20.5 (48.3) | 68.6 (45.2) | 7.3 (3.7) | 3.6 (2.8) | | +4° C. | 35,000 | 78,000 |
| 20 | 18.2 (44.6) | 69.9 (48.1) | 8.0 (4.2) | 4.0 (3.2) | 4.67 | +11° C. | 38,000 | 88,000 |
| 21B | 18.7 (45.4) | 72.3 (49.1) | 6.0 (3.1) | 3.0 (2.4) | | +8° C. | | |

B. Preparation of Coatings

1. Ten grams of the ethylene/methyl methacrylate/2-hydroxyethyl methacrylate/methacrylic acid copolymer of part A, state 20, was dissolved in 150 ml of 1/1 toluene/methyl ethyl ketone, and the solution was concentrated to 25 g under reduced pressure. Two grams of butyl Cellosolve ® (the monobutyl ether of ethylene glycol) and 1.76 g of Resimene ® X-735 were added, and the solution was coated on glass panels and on flexible panels made of a commercial thermoplastic elastomer, after which the panels were baked at 275° F. (135° C.) for 30 minutes. In the bend test described in Example 1-B-2, a coating on a flexible panel wrinkled but did not crack at room temperature and showed many small cracks at −20° C. A coating on glass showed no change in the Cleveland humidity test of Example 1-B-3. Its behavior toward ultraviolet light is given in Table 4.

2. A sample of the ethylene/methyl methacrylate/2-hydroxyethyl methacrylate/methacrylic acid copolymer of part A, state 19, was dissolved in 3/1 methyl ethyl ketone/butyl Cellosolve ® to give a 27.5% solution. Resimene ® X-735 was added to give an 85/15 copolymer/Resimene ® solution, which was cast to give coatings on glass and on flexible panels as in part 1. Coatings wrinkled but did not crack in the bend test at room temperature and gave many large cracks at −20° F. (−29° C.). A coating on glass showed no change in the Cleveland humidity test. Its behavior toward ultraviolet light is given in Table 4.

3. Twenty grams of the ethylene/methyl methacrylate/2-hydroxyethyl methacrylate/methacrylic acid copolymer of part A, state 19, was frozen in liquid nitrogen and pulverized with a hammer. The powdered copolymer was stirred with 24.3 g of methyl ethyl ketone and 30 g of water while 2-dimethylaminoethanol was added periodically over several hours, until the solid was completely dispersed. At this point the pH was 8.78. A solution of 3.53 g of Resimene ® X-735 in 2.1 g of butyl Carbitol ® was stirred in, and the resulting dispersion was cast on glass and flexible panels and baked at 225° F., 250° F., 275° F., and 300° F. (107° C., 121° C., 135° C., and 149° C.) to give coatings. A coating baked on glass at 275° F. showed no change in the Cleveland humidity test. A flexible coating did not crack in the bend test at room temperature but cracked at −20° F. (−29° C.). Behavior toward ultraviolet light is summarized in Table. 4.

TABLE 4

| | | BEHAVIOR OF COATINGS TO ULTRAVIOLET LIGHT | | | | |
|---|---|---|---|---|---|---|
| Coating Described in Part | Bake Temp. °F. (°C.) | Tukon Hardness (KHN) | Yellowing (ΔB, Colorimeter) | Hours Exposure | Tukon Hardness (KHN) | Yellowing (ΔB, Colorimeter) |
| B-1 | 275 (135) | 14.1 | −0.50 | 414 | 7.15 | +0.70 |
| B-2 | 275 (135) | 22.2 | +0.26 | 414 | 7.99 | +1.33 |
| B-3 | 225 (107) | 10.02 | −0.38 | 752 | 6.30 | +0.78 |
| B-3 | 250 (121) | 11.23 | −0.40 | 752 | 5.41 | +0.48 |
| B-3 | 275 (135) | 12.10 | +0.23 | 752 | 8.55 | +1.33 |
| B-3 | 300 (149) | 12.17 | +0.23 | 752 | 8.06 | +0.87 |

EXAMPLE 5

A. Preparation of Copolymer Dispersion

The ethylene/methyl methacrylate/2-hydroxyethyl methacrylate/methacrylic acid of Example 4A, state 21B, (90 g) was frozen in liquid nitrogen, pulverized with a hammer, and stirred with methyl ethyl ketone at room temperature until the polymer dissolved. Then the solution was warmed with a nitrogen sweep to reduce the volume until the total weight was 109 g. Then 1.8 g of 2-dimethylaminoethanol was added (approx. 75% neutralization of the polymer), followed by 135 g of water, giving a pH of 8.2. The pH was adjusted to 8.8 with dimethylaminoethanol, 50 g of water was added, and the dispersion was stirred overnight. After 11 days the dispersion was a thick paste. It was stirred while water was added in six 25-mil increments, and then stirred overnight. Butyl Carbitol ® (4.5 g) was added, and the mixture was stirred 1.5 hours. The pH (8.6) was adjusted to 8.8 with 2-dimethylaminoethanol. Addition of 50 ml of water gave a very fluid, translucent dispersion (pH 8.9) containing 18% solids.

B. Preparation of Blue Pigment Dispersion

A mixture of 69.9 g of Monastral ® blue phthalocyanine pigment, 466 g of a 30.06%-solids dispersion of an ethylene/methyl methacrylate/acrylic acid (13.9/77.3/8.8) copolymer binder, and 64.1 g of demineralized water was stirred until the pigment was wet, and then was sand-ground for one hour to give a pigment dispersion containing 31.8% solids (21.2% binder and 10.6% pigment). The copolymer binder was prepared by the method of Example 3A. It had $\overline{M}_n$ 1100, $\overline{M}_w$ 4400 (gpc) and $T_g + 20°$ C. (dsc), and its dispersion had been brought to pH 8.6 with 2-dimethylaminoethanol.

C. Preparation of Aluminum Flake Millbase

This millbase was prepared by mixing 76.9 g of a dispersion of 65% extremely fine aluminum flake in butyl Carbitol ®, 184.2 g of a dispersion of 54.3% ethylene/methyl methacrylate/acrylic acid copolymer binder, 9.36 g of 2-dimethylaminoethanol, and 104.5 g of butyl Carbitol ®. The final dispersion contained 41.2% solids. The copolymer binder was prepared by the method of Example 3A and part B, above, but was used as obtained from the reactor, without adjustment of pH. It had $\overline{M}_n$ 2400, $\overline{M}_w$ 12,000 (gpc), $T_g + 17°$ C. (dsc), and $\eta_{inh}$ 0.102 (0.5% in $CH_2Cl_2$ at 25° C.).

D. Preparation of Coatings

The copolymer dispersion of part A (277.8 g), 9.8 g of aqueous 90% Resimene ® X-2-735, 8.9 g of butyl Carbitol ®, 2.9 g of 20% dodecylbenzenesulfonic acid in butanol (neutralized with dimethylaminoethanol), 0.68 g of the blue pigment dispersion of part B, and 12 g of the aluminum flake millbase of part C were combined, and the pH was adjusted to 8.6. The resulting lightblue metallic paint was suction-sprayed onto Bonderite ®-40 steel primed with a commercially available flexible lacquer primer DEL-32906 and onto thermoplastic polyurethane panels. The panels were baked using the following schedule: 15 min at 140° F. (60° C.), 10 min at 160° F. (71° C.), 10 min at 180° F. (82° C.), 10 min at 200° F. (93° C.), and 30 min at 250° F. (121° C.). A 2.0-mil (0.05-mm) coating on steel had a Tukon hardness of 8.3 KHN and gloss values of 35 (measured optically with a 20° incident angle and a 20° viewing angle from the vertical) and 71 (same, but 60° angles). Tukon hardnesses for two 1.7 mil coatings were 10.9 and 9.9 KHN; the corresponding gloss values were 42 and 40 (20°) and 77 and 75 (60°).

EXAMPLE 6

A. Preparation of Copolymer

Ethylene, methyl methacrylate, 2-hydroxyethyl methacrylate, and methacrylic acid were copolymerized in a manner similar to that described in Example 2A, except that the pressure was 52–64 MPa. instead of 41 MPa. The copolymer was obtained as an emulsion containing 19.0% solids. The weight percent composition of the copolymer by nmr was 20.2/65.5/9.5/4.8. Via elemental analysis by the method described in Example 1A, the weight percent composition was 15.8/67.6/11.1/5.5 ethylene/methyl methacrylate/2-hydroxyethyl methacrylate/methacrylic acid. The corresponding mole percent composition is 40.5/48.7/6.1/4.6. The copolymer had $\eta_{inh}$ 0.365 (0.5% in CHCl$_3$ at 25° C.) and T$_6$+41° C. (dsc).

B. Preparation of Coatings

Part of the copolymer emulsion of part A was adjusted to pH 8.0 with 2-dimethylaminoethanol and stirred in a round-bottomed flask at 60° C. under a stream of nitrogen until concentrated to 30.9% solids. The resulting emulsion (242.7 g) was combined with 14.7 g of aqueous 90% Resimene ® X-2-735, 17.6 g of butyl Carbitol ®, 4.4 g of 20% dodecylbenzenesulfonic acid in butanol (neutralized with 2-dimethylaminoethanol), 1.02 g of blue pigment dispersion from Example 5B and 18.0 g of aluminum flake millbase from Example 5C to give a light-blue metallic paint. The paint was suction-sprayed onto the same type of panels as described in Example 5D and baked according to the bake schedule of that example. The data collected are shown in Table 5. Gloss was determined at two angles, as in Example 5D.

TABLE 5

| Film Thickness mils (mm) | Tukon Hardness (KHN) | Gloss 20° | Gloss 60° |
|---|---|---|---|
| 2.3 (0.058) | 6.5 | 47 | 78 |
| 2.2 (0.056) | 7.6 | 45 | 77 |
| 2.1 (0.053) | 8.0 | 48 | 74 |

A coating made in the same way from a similar paint, in which the pH of the copolymer emulsion was 7.5, had a hardness of 11.0 KHN (2.6 mils; 0.066 mm) and gloss values of 43 (20°) and 77 (60°).

We claim:
1. Curable coating composition containing the film-forming ingredient consisting essentially of, with the sums of the parts by weight and the mole percentages being 100 and 100%, respectively:
   (1) about 55–95 parts by weight of a copolymer of
      (a) 20–70 mole % ethylene,
      (b) 20–60 mole % methyl methacrylate,
      (c) 1–15 mole % of a hydroxyalkyl ester of acrylic acid or methacrylic acid in which the hydroxyalkyl group contains 2–4 carbon atoms, and
      (d) 0–9 mole % of an α,β-unsaturated carboxylic acid selected from acrylic acid, methacrylic acid, itaconic acid, crotonic acid, 2-ethylacrylic acid, and 2-propylacrylic acid, or of maleic anhydride, and
   (2) about 5–45 parts by weight of a nitrogen-resin crosslinking agent.

2. Composition of claim 1 wherein the hydroxyalkyl ester is a hydroxyalkyl methacrylate.

3. Composition of claim 2 wherein the hydroxyalkyl methacrylate is 2-hydroxyethyl methacrylate.

4. Composition of claim 1 wherein component (d) is an α,β-unsaturated carboxylic acid selected from acrylic acid and methacrylic acid.

5. Composition of claim 4 wherein the acid is methacrylic acid.

6. Composition of claim 1 wherein the crosslinking agent is an alkylated melamine-formaldehyde resin.

7. Emulsion or dispersion of the composition of claim 1.

8. Emulsion or dispersion of claim 7 having a pH of about 6 to about 9.

9. Emulsion or dispersion of claim 7 wherein some or all pendent carboxyl groups of the copolymer have been neutralized.

10. Emulsion or dispersion of claim 9 wherein the neutralization has been effected with an alkylamine or hydroxyalkylamine.

11. Emulsion or dispersion of claim 10 containing a pigment.

12. Solution of the composition of claim 1 in one or more organic solvents.

13. Solution of the composition of claim 1 in a mixture of toluene and methyl ethyl ketone.

14. Solution of the composition of claim 1 in a mixture of methyl ethyl ketone and butyl Cellosolve ®.

* * * * *